United States Patent
Kingston et al.

(10) Patent No.: US 8,490,855 B2
(45) Date of Patent: Jul. 23, 2013

(54) METHODS TO FABRICATE FULLY ENCLOSED HOLLOW STRUCTURES USING FRICTION STIR WELDING

(71) Applicant: Megastir Technologies LLC, Provo, UT (US)

(72) Inventors: Russell Kingston, West Jordan, UT (US); Murray Mahoney, Midway, UT (US); Russell J Steel, Salem, UT (US); Scott M. Packer, Alpine, UT (US)

(73) Assignee: MegaStir Technologies LLC, Provo, UT (US)

( * ) Notice: Subject to any disclaimer, the term of this patent is extended or adjusted under 35 U.S.C. 154(b) by 0 days.

(21) Appl. No.: 13/686,694

(22) Filed: Nov. 27, 2012

(65) Prior Publication Data

US 2013/0098973 A1     Apr. 25, 2013

Related U.S. Application Data

(63) Continuation of application No. 13/196,726, filed on Aug. 2, 2011, now Pat. No. 8,317,080.

(60) Provisional application No. 61/369,923, filed on Aug. 2, 2010.

(51) Int. Cl.
*B23K 20/12* (2006.01)
*B23K 31/02* (2006.01)

(52) U.S. Cl.
USPC ........................................ 228/112.1; 228/159

(58) Field of Classification Search
None
See application file for complete search history.

(56) References Cited

U.S. PATENT DOCUMENTS

| | | | |
|---|---|---|---|
| 1,039,674 A | 9/1912 | Schatz | |
| 2,177,928 A | 10/1939 | Knudsen | |
| 2,341,044 A * | 2/1944 | Jackson et al. | 220/584 |
| 2,503,190 A | 4/1950 | Branson | |
| 2,963,772 A | 12/1960 | Niles, Sr. | |
| 3,144,710 A | 8/1964 | Hollander et al. | |
| 3,277,561 A * | 10/1966 | Joyal | 29/892.11 |
| 3,299,193 A | 1/1967 | Vergara | |
| 3,510,183 A | 5/1970 | Liss | |
| 3,518,742 A | 7/1970 | Merrill et al. | |
| 3,522,647 A | 8/1970 | Holcomb et al. | |
| 3,587,154 A | 6/1971 | Potter | |
| 3,767,890 A | 10/1973 | Madden, Jr. | |
| 3,772,750 A | 11/1973 | Hauser | |
| 3,774,280 A | 11/1973 | Eklund et al. | |
| 4,561,476 A | 12/1985 | Bunkoczy | |
| 5,659,956 A | 8/1997 | Braginsky et al. | |
| 5,979,873 A | 11/1999 | Wu | |
| 6,051,325 A | 4/2000 | Talwar et al. | |

(Continued)

FOREIGN PATENT DOCUMENTS

JP     2002346767 A     12/2002

*Primary Examiner* — Kiley Stoner
*Assistant Examiner* — Carlos Gamino
(74) *Attorney, Agent, or Firm* — Morris O'Bryant Compagni, PC

(57) ABSTRACT

A method is taught for creating a hollow sphere that is created by joining two cylinders together that have a semispherical hollow formed in the ends being joined together, wherein a metallic reinforcing disk is inserted at an interface between the two ends of the cylinders, wherein the two cylinders and reinforcing disk are joined using friction stir welding to create an inner sphere from the two hemispherical hollows that is bisected by the metallic reinforcing disk, and wherein the joined cylinders and reinforcing disk are machined to thereby create an outer spherical surface that is centered around the inner sphere.

9 Claims, 8 Drawing Sheets

U.S. PATENT DOCUMENTS

| | | |
|---|---|---|
| 6,899,599 B1 | 5/2005 | Hsiang-Hui |
| 7,430,888 B2 | 10/2008 | Osame et al. |
| 7,571,531 B2 | 8/2009 | Tessien et al. |
| 7,874,471 B2 | 1/2011 | Fairchild et al. |
| 8,006,890 B2 | 8/2011 | Okamoto et al. |
| 8,141,764 B1 | 3/2012 | Potter et al. |
| 2006/0261073 A1 | 11/2006 | Kanno |
| 2012/0006562 A1 | 1/2012 | Speer et al. |

* cited by examiner

US 8,490,855 B2

METHODS TO FABRICATE FULLY ENCLOSED HOLLOW STRUCTURES USING FRICTION STIR WELDING

CROSS REFERENCE TO RELATED APPLICATIONS

This document claims priority to and incorporates by reference all of the subject matter included in the provisional patent application, having Ser. No. 61/369,923.

BACKGROUND OF THE INVENTION

1. Field of the Invention

This invention relates generally to friction stir welding (FSW) of a hollow and spherical object. Specifically, the invention relates to the problems of creating a hollow metallic sphere with a reinforcing bisecting disk disposed therein, wherein toe sphere has a desired specific gravity that enables the sphere to have a neutral or positive buoyancy in a given fluid media.

2. Background of the Problems being Solved

Friction stir welding is a technology that has been developed for welding metals and metal alloys. The FSW process often involves engaging the material of two adjoining workpieces on either side of a joint by a rotating stir pin. Force is exerted to urge the pin and the workpieces together and frictional heating caused by the interaction between the pin, shoulder and the workpieces results in plasticization of the material on either side of the joint. The pin and shoulder combination or "FSW tip" is traversed along the joint, plasticizing material as it advances, and the plasticized material left in the wake of the advancing FSW tip cools to form a joint. The FSW tip can also be a tool without a pin, which is a shoulder that is still capable of processing another material through friction stir processing (FSP).

FIG. 1 is a perspective view of a tool being used for FSW that is characterized by a generally cylindrical tool 10 having a shank 8, a shoulder 12 and a pin 14 extending outward from the shoulder. The pin 14 is rotated against a workpiece 16 until sufficient heat is generated, at which point the pin of the tool is plunged into the plasticized workpiece material. Typically, the pin 14 is plunged into the workpiece 16 until reaching the shoulder 12 which prevents further penetration into the workpiece. The workpiece 16 is often two sheets or plates of material that are butted together at a joint line 18, or overlapping to form a lap joint. In this example, the pin 14 is plunged into the workpiece 16 at the joint line 18.

As the tool 10 is rotated, torque is transmitted from the rotating shank 8 to the FSW tip 24. When the tool 10 is being used on a workpiece that is a high melting temperature material such as steel, the FSW tip 24 is in many situations exposed to temperatures in excess of 1000 degrees C. as it is rotated while traversing steel softened by frictional heating.

Referring to FIG. 1, the frictional heat caused by rotational motion of the pin 14 against the workpiece material 16 causes the workpiece material to soften without reaching a melting point. The tool 10 is moved transversely along the joint line 18, thereby joining the workpieces as the plasticized material flows around the pin 14 from a leading edge to a trailing edge. The result is a solid phase bond 20 at the joint line 18 that may be generally indistinguishable from the workpiece material 16 itself, in contrast to welds using other conventional technologies. It is also possible that the solid phase bond 20 is superior to the original workpiece material 16 because of the mixing that occurs. Furthermore, if the workpiece material is comprised of different materials, the resulting mixed material may also be superior to either of the two original workpiece materials.

It is observed that when the shoulder 12 contacts the surface of the workpieces, its rotation creates additional frictional heat that plasticizes a larger cylindrical column of material around the inserted pin 14. The shoulder 12 provides a forging force that contains the upward metal flow caused by the rotating tool pin 14.

During friction stir welding, the area to be joined and the tool 10 are moved relative to each other such that the tool traverses a desired length of the joint. Depending upon characteristics of the tool 10, the tool may penetrate fully or partially into the joint. The rotating friction stir welding tool 10 provides a continual hot working action, plasticizing metal within a narrow zone as it moves transversely along the workpiece materials 16, while transporting metal from the leading edge of the pin 14 to its trailing edge. As a joint cools, there is typically no solidification as no liquid is created as the tool 10 passes. It is often the case, but not always, that the resulting joint is a defect-free, recrystallized, fine grain microstructure formed in the area of the joint.

Travel speeds are typically 10 to 500 mm/min with rotation rates of 200 to 2000 rpm. Temperatures reached are usually close to, but below, solidus temperatures. Friction stir welding parameters are a function of a material's thermal properties, high temperature flow stress and penetration depth.

Friction stir welding has several advantages over fusion welding because 1) there is no filler metal, 2) the process can be fully automated requiring a relatively low operator skill level, 3) the energy input is efficient as all heating occurs at the tool/workpiece interface, 4) minimum post-weld inspection is required due to the solid state nature and extreme repeatability of FSW, 5) FSW is tolerant to interface gaps and as such little pre-weld preparation is required, 6) there is typically no weld spatter to remove, 7) the post-joining surface finish can be exceptionally smooth with very little to no flash, 8) there is often no porosity and oxygen contamination, 9) there is little or no distortion of surrounding material, 10) no operator protection is required as there are no harmful emissions, and 11) joint properties are often improved. Throughout this document, friction stir welding will be considered to include all processes that can be performed using a friction stir welding tool, including but not limited to friction stir processing, friction stir spot welding and friction stir mixing.

Previous patent documents have taught the benefits of being able to perform friction stir welding with materials that were previously considered to be functionally unweldable. Some of these materials are non-fusion weldable, or just difficult to weld at all. These materials include, for example, 7075 aluminum, a material which is considered to be unweldable.

The previous patents teach that a tool for friction stir welding of high temperature materials is made of a material or materials that have a higher melting temperature than the material being joined friction stir welding. In some embodiments, a superabrasive was used in the tool, sometimes as a coating.

The embodiments of the present invention are generally concerned with these functionally unweldable materials, whether they are high melting temperature or low melting temperature but functionally unweldable.

Today's industry requires many structural components to perform a variety of functions and services in specific applications. Some of these applications require hollow structures made of a continuous material or materials. For example, a hollow sphere or cylinder would be such a structure. Practical applications using these hollow geometries would be pressure vessels and/or check valves used to either contain pressure on the inside of said structure, or withstand pressure from the outside or even some combination of the two. These applications require specific strength to weight ratios, specific gravities, uniform elastic properties, uniform plastic deformation properties, yield strengths, tensile strengths, as well as specific mechanical properties at varying temperatures and environmental conditions. Many of these applications require corrosion resistance and/or thermal stability as they are subject to extreme conditions.

Hollow structures such as pressure vessels, check valves and many other types of structures can be fabricated using the following five approaches:

Mechanical Attachment—Curved and/or flat components are assembled together according to design specifications and mechanically attached using screws, bolts or other mechanical fasteners to create an enclosed structure. Many times seals are used with these structures to ensure pressure specifications are maintained.

Welding—Conventional welding methods are used to join curved and/or flat components together to form a hollow structure. These methods include but are not limited to TIG, MIG, SubArc, ERW, Laser, etc.

Brazing—This technique is similar to welding but uses a lower melting temperature metal to join higher temperature components together.

Inertia welding—This technique is a solid state welding method that can be used to join circular components together.

Linear friction welding—This technique is similar to inertia welding except that the motion is linear as opposed to orbital.

Clearly, hollow structures can also be made by combining the above methods to achieve some success in order to construct the hollow structures.

3. Problems with Existing Art

Mechanical attachment using screws, bolts, fasteners, seals, etc. is disadvantageous because of high fabrication costs, increased weight, corrosion issues due to galvanic coupling, and design limitations. These costs arise from designing multiple components with accompanying tolerances, overdesign using safety factors in consideration of the stress risers created by mechanical attachment points, increased fabrication time and costs to meet tolerances, and fixturing costs to build components. In addition, in many cases, mechanical attachment to form an enclosed structural component cannot meet design requirements. In the case of pressure vessels, there is always rework to consider when pressure tests reveal leaks or excessive component strain.

Mechanical joints in hollow structures are also subject to fatigue failure at attachment points and stress riser locations and therefore require either more material, adding weight, or increased engineering expense to analyze structural performance with subsequent design modification for a given application. In addition, seals are used to contain pressure when components are fastened together and are the weakest material in the system and subject to leaks because of fit up, wear, thermal cycling damage, or inherent low strength.

Joining components using conventional welding methods has several severe disadvantages. Component materials must be selected based on weldability. Higher strength materials could lower the component construction cost, reduce the cost to the end user, reduce weight, and improve performance. However, many of the higher strength materials are not considered weldable. Further, the weld joint itself reduces the strength of the base metal components due to the weld's extensive heat affected zone and the cast microstructure created by melting and subsequent solidification. Following conventional fusion welding, base metal properties can be reduced by as much as 50%. More material must be used in the design of the structure to account for this weld zone weakness and therefore increases the weight and cost of the structure.

Because any fusion welding relies on melting of the faying surfaces, the weld is prone to solidification cracking, solidification defects, porosity, unpredictable and high residual stresses, material segregation, and component distortion. In addition, when a filler metal is required, the use of a dissimilar welding material increases the risk of galvanic corrosion between the weld and the base metal. Rework costs are extremely high to address distortion and additional welding attempts to repair cracks and welding defects.

Almost all of the nondestructive test methods that have been developed and are in use today were designed to identify poor quality weld joints. In fact, these tests are quite effective at locating and measuring any defect. The welding industry specifies that a crack is only a defect when it exceeds a given length even though it can be measured ultrasonically or with X-Ray. This acknowledges that welding inherently creates cracks and fusion welding is not capable of producing crack free structures. Design engineers attempt to account for these small cracks in structures by increasing component size or by overdesign to account for the inadequacies of welding.

Brazing has limitations different from those of welding. First, the braze alloy is a lower temperature material and thus is most often low strength, especially at elevated temperatures. Thus, brazing creates a weak location in the fabricated structure. Second, brazing requires the entire structure to be brought to elevated temperature. Often this is not practical for both cost and facility size limitations. Also, for many materials, the strength decreases at elevated temperature and is not recovered without costly subsequent heat treatments or, for work hardenable materials, cannot be recovered. Thus, for brazing, either material selection is limited or strength of the entire structure is reduced.

When higher strength materials cannot be used to create a hollow structure, with either mechanical attachment or welding because they fail to meet design requirements, a lower strength, lower density material must be used. By using lower strength materials, the overall design of the system using the solid structure must be downgraded, thereby limiting the design range of an entire system.

Some applications require the hollow structure to maintain a neutral or positive buoyancy in a given fluid media and would, for example, benefit from a hollow structure made from higher strength materials to resist higher forces. Since there is no method to make such a structure, a lower strength material with a given specific gravity is used and therefore limits the application's range of usefulness.

An example of a buoyant but lower strength material would be with a ball and seat in a check valve. Many check valves are designed to have a ball that releases from the seat when the pressure that seated the ball is removed. The ball must be buoyant in the fluid to float away from the seat and open the valve. The pressure of the entire system will be limited by the strength of the ball and seat material strength as well as the design. A lower strength solid ball with a given specific gravity could be used by increasing the size of the seat to minimize ball/seat contract stresses. The seat area will need to be substantially higher to accommodate higher operating fluid pressure. This can only be done by choking the system flow to account for reduced valve area. This greatly limits possible applications that require high fluid flow rates at high pressures.

Inertia welding can be used to join two hollow sections of a ball together by spinning one component against another. However, inertia welding limited to symmetric shapes, limited to certain materials, and the final shape is difficult to control due to the final upset procedure. Further, this joining method creates a tremendous amount of flash that forms both on the outside and inside of the component. Flash cannot be removed on the inside and is a variable that prevents careful control of the specific gravity of the component. This process is limited to smaller symmetrical parts and can produce heat affected zones similar to traditional fusion methods. Linear friction welding is also limited to specific shapes but also suffers from very high capital equipment costs and lack of available facilities to perform this very special joining method.

It would be an advantage over the prior art to provide a high strength material that can be used to create a hollow structure having a desired specific gravity and which can be manufactured to very precise dimensions of various diameters.

BRIEF SUMMARY OF THE INVENTION

In one embodiment of the present invention, a method is taught for creating a hollow sphere that is created by joining two cylinders together that have a semispherical hollow formed in the ends being joined together, wherein a metallic reinforcing disk is inserted at an interface between the two ends of the cylinders, wherein the two cylinders and reinforcing disk are joined using friction stir welding to create an inner sphere from the two hemispherical hollows that are bisected by the metallic reinforcing disk, and wherein the joined cylinders and reinforcing disk are machined to thereby create an outer spherical surface that is centered around the inner sphere.

These and other aspects, features, advantages of the present invention will become apparent to those skilled in the art from a consideration of the following detailed description taken in combination with the accompanying drawings.

DETAILED DESCRIPTION OF THE INVENTION

Reference will now be made to the drawings in which the various elements of embodiments of the present invention will be given numerical designations and in which the invention will be discussed so as to enable one skilled in the art to make and use the embodiments. It is to be understood that the following description is only exemplary of the principles of the present invention, and should not be viewed as narrowing the claims which follow.

Several approaches are listed below that make possible the fabrication of hollow enclosed structures and thus the elimination of problems associated with mechanical attachment, welding, brazing, and lower strength materials. The common concept for each method listed below is the use of a solid state joining process that produces a higher quality joint without strength reductions or material selection limitations.

There are many enclosed hollow structures that could be discussed in this invention to illustrate the concepts of the embodiments of the invention listed below. These structures could be large or small, symmetric or asymmetric, the same material or dissimilar materials, and many other possible configurations or combinations. Without departing from the spirit of this invention and the many applications of a hollow structure geometry, the fabrication of a sphere is used herein to clearly illustrate the invention.

Friction Stir Welding

The concept of friction stir welding (FSW) has been well documented over the past several years; however, a novel approach using FSW to create a hollow sphere is described herein. Base materials such as steel, aluminum, nickel, copper or any material could be used in this concept to create a hollow metal sphere. In this example, a hollow sphere is made using AA 7075, an aluminum alloy that is considered unweldable. It is important to note that AA 7075 is used in the aircraft industry in sheets which are riveted to an airframe of a commercial airliner.

The use of AA 7075 is important because of the strength of the material, coupled with the ability to float in a liquid medium. This same material was laser welded which resulted in a weld having numerous cracks and flaws. The result was that the hollow sphere failed when extreme pressures were applied. However, when the same material was joined using friction stir welding, the resulting sphere was capable of withstanding extreme pressures.

Figure 1:
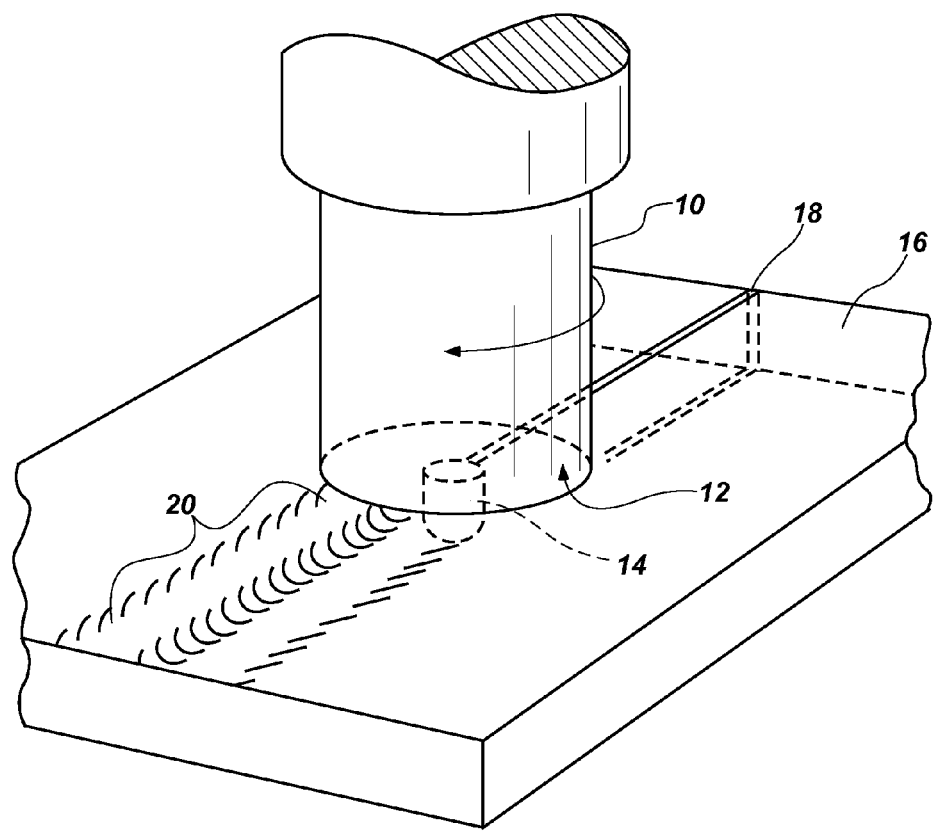
FIG. 1 is a perspective view of a tool as taught in the prior art for friction stir welding.
Figure 2:
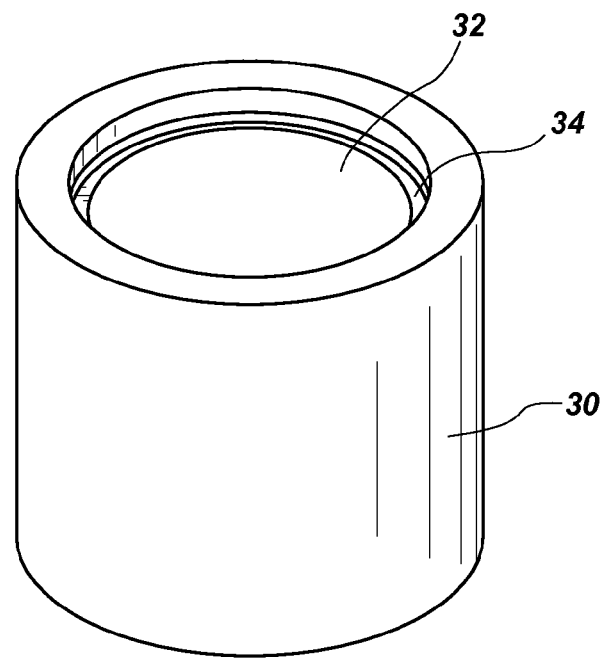
FIG. 2 is a perspective view of a machined or otherwise formed hollow half section.

FIG. 2 shows an AA 7075 half section 30 that has been machined with a cylindrical outside geometry and a semispherical hollow section 32. The hollow section 32 has a counter bore 34 machined in place so that an internal support made of the same or other material can be placed inside the half section 30.

Figure 3:
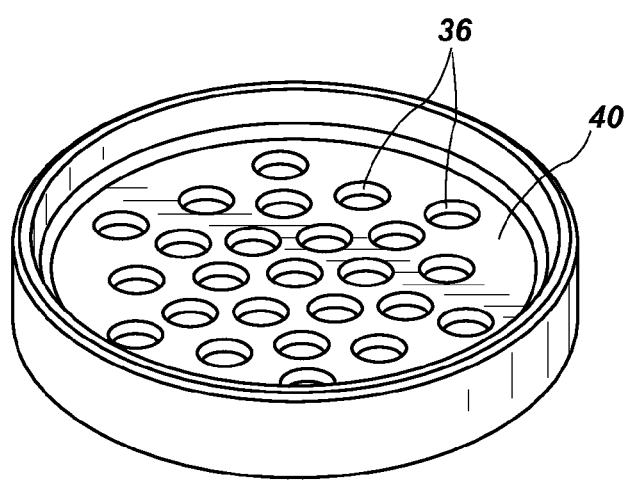
FIG. 3 shows an internal support structure or reinforcing metallic disk used to react the loads from a friction stir welding tool.

FIG. 3 shows an internal support structure 40 used to react the loads from a friction stir welding tool. The internal support structure 40 will be disposed between two half sections 30 to bisect the sphere formed from the two half sections. The internal support structure 40 can be made, for example, from steel or other ferrous alloy.

The internal support structure 40 is comprised of a disk of material that has a plurality of perforations 36 therethrough. The purpose of the perforations 36 is not to weaken the internal support structure 40, but simply to reduce the weight in order for the resulting hollow sphere to be able to float in the desired medium. The exact shape of the perforations 36 through the internal support structure 40 is not important and they can be made to be any desired shape as long as they do not compromise the integrity of the internal support structure.

Figure 4:
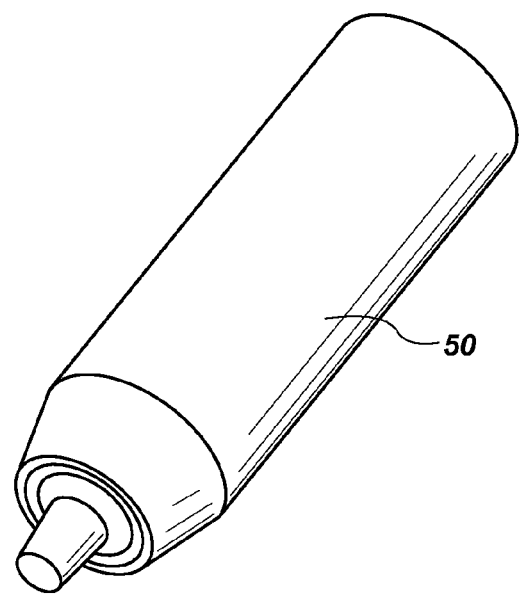
FIG. 4 is an example of a friction stir welding tool made from H13 tool steel and used to join the workpieces by friction stir welding the joint between the AA 7075 hollow half sections. Those skilled in the art are aware of the many tool geometries and designs that can be used to friction stir weld a variety of materials.

FIG. 4 shows an example of a friction stir welding tool 50 made from H13 tool steel and used to friction stir weld the joint between the AA 7075 hollow half sections 30. The literature of friction stir welding shows the many configurations of tool geometries used to friction stir weld a variety of materials, and the specific shape of the tool 50 is not considered to be a limiting factor of the present invention. Accordingly, the tool can have any desired composition, coatings, surface features and pin and shoulder structure.

In order to assemble a hollow sphere, the half sections 30 and internal support structure 40 are placed in a final desired configuration or assembly and then held together in a fixturing that will rotate and support the assembly during FSW. Such a fixturing is known to those skilled in the art and is not considered to be a limiting factor of the present invention.

Figure 5:
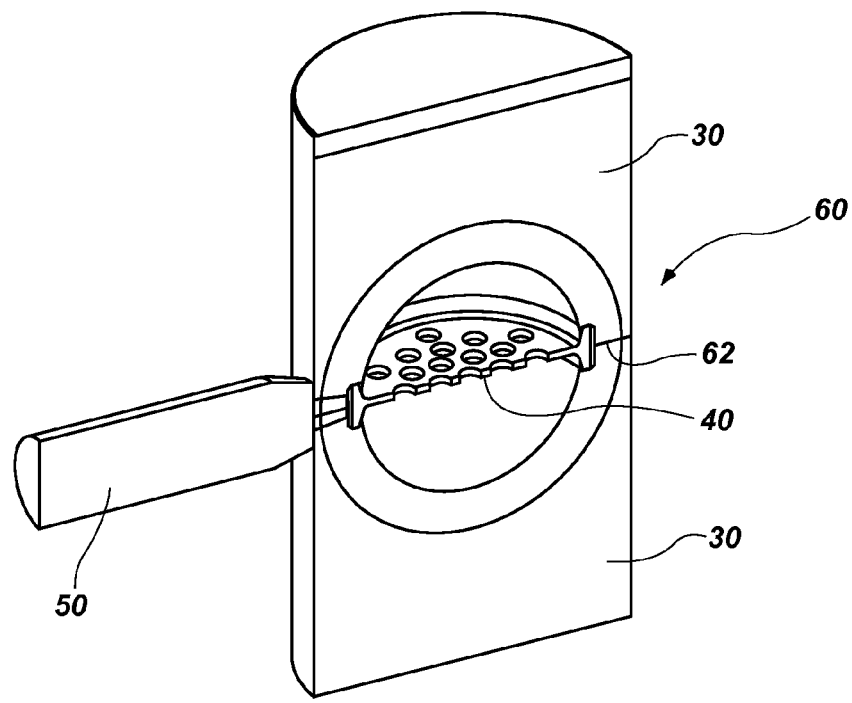
FIG. 5 is a cross-sectional perspective view of the assembly during FSW.

FIG. 5 shows a hollow assembly 60 in a cross sectional view during FSW by the FSW tool 50. The FSW tool 50 begins rotation, plunges into the hollow assembly 60 at the joint 62 over the internal support structure 40 and the two half sections 30, and travels along the joint to friction stir join each of the half sections together. It is important to note that the internal support structure 40 has become part of the joint 62 and is not free to move within the hollow assembly 60.

Figure 6:
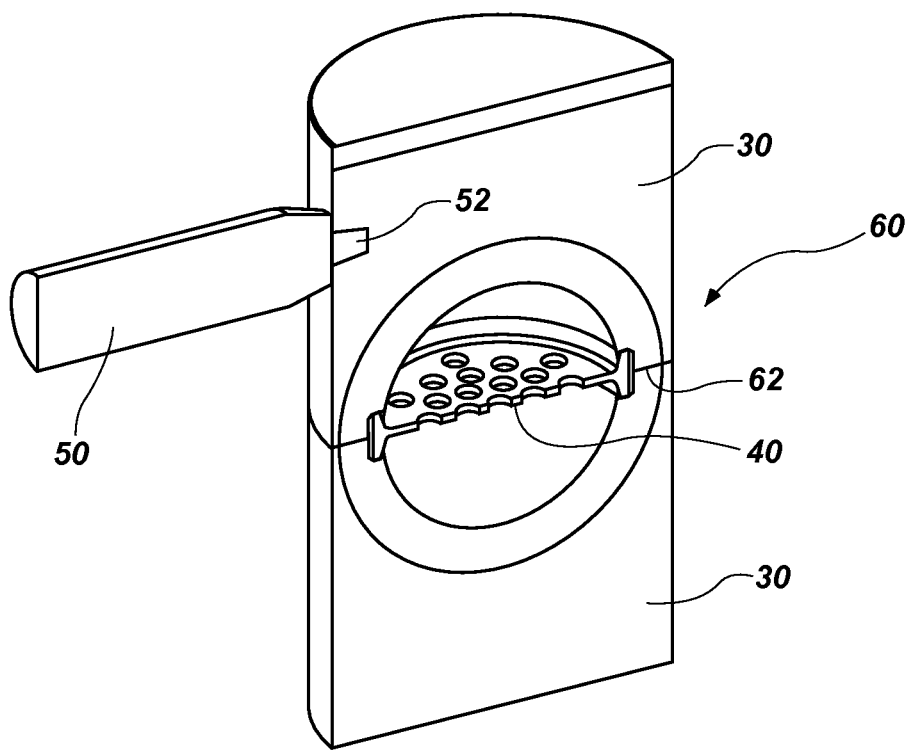
FIG. 6 is a cross-sectional perspective view that shows the position of the FSW tool shown in FIG. 5 after the to has traveled away from the FSW joint so the FSW tool pin profile can be removed in later operations if needed.

FIG. 6 shows the position of the FSW tool 50 after traveling away from the FSW joint 62 so the pin tool profile 52 of the FSW tool 50 can be removed in later operations if needed. Other methods can be employed to remove the pin tool profile 52. One method is to use a FSW tool that has a retractable pin that retracts into the body of the FSW tool once the FSW joint 52 has been processed by friction stir welding. Another method is to use the same material as the half sections 30 and friction plug the FSW joint 62 in place. A third approach is to use a run-off tab. What is important is that the pin can be removed from the hollow assembly 60 without leaving a hole.

Figure 7:
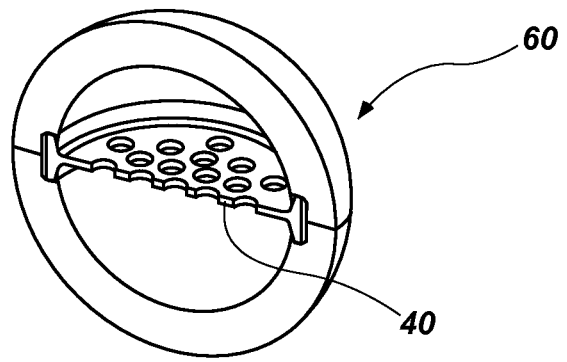
FIG. 7 is a cross-sectional perspective view from FIG. 6 that shows a section view of the hollow support structure or hollow aluminum sphere in this case after machining.

FIG. 7 shows a cross-sectional view of the hollow assembly 60 with the internal support structure 40, which is a hollow aluminum sphere in this case, after machining. The machining is performed on the outside of the hollow assembly 60 to form the spherical shape, and the methods of doing this are well known to those skilled in the art.

Figure 8:
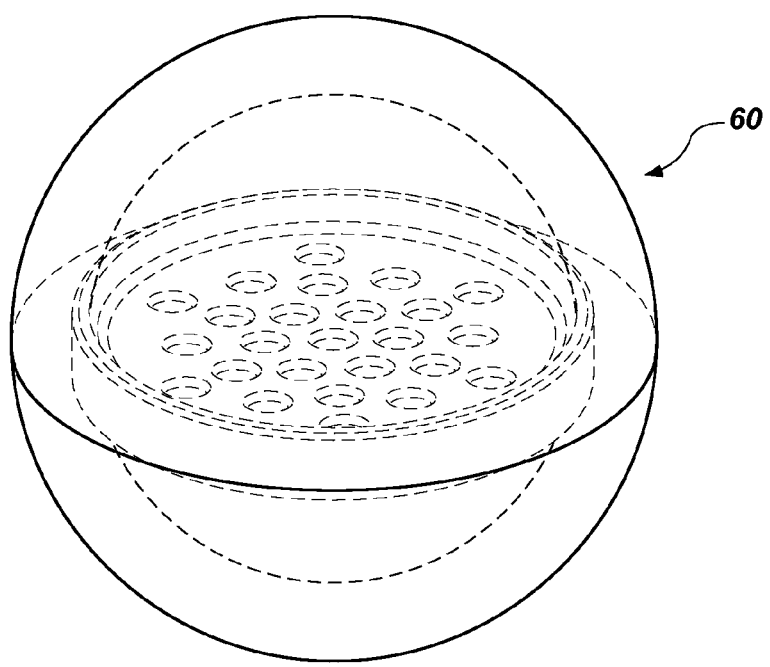
FIG. 8 is a perspective view that snows the complete sphere of FIG. 8.

FIG. 8 is a perspective view showing the finished hollow sphere 60. While the joining of two hollowed halves together to form the sphere is the first embodiment, the present invention is not limited to this design.

In an alternative embodiment, the internal support structure 40 could be removed after it is used to provide support when the hollow sphere 60 is being joined. The manner by which the internal support structure could be eliminated is by using a bobbin FSW tool. A bobbin FSW tool is a tool that has a reactive bobbin that reacts the shoulder forces of the FSW tool 50. The bobbin tool would be inserted much like expandable fasteners found at hardware stores used as attachment and holding points on sheet rock used in the home and industrial construction industries.

Figure 9:
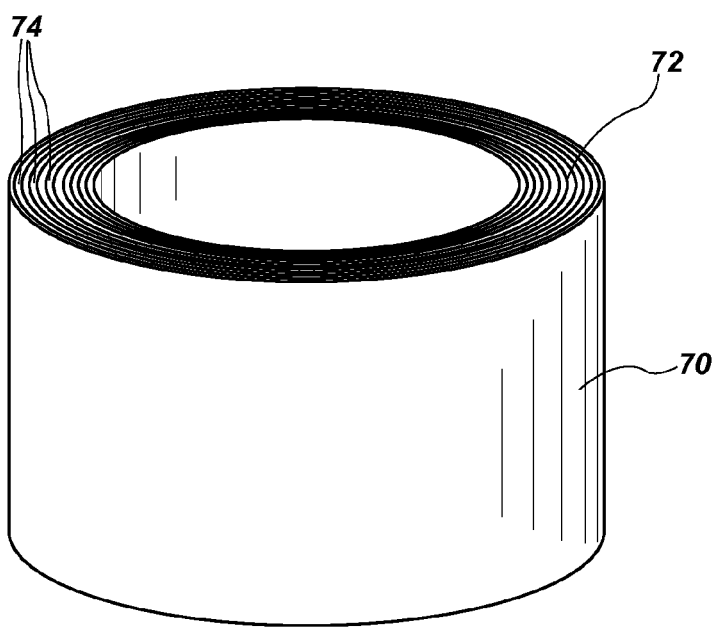
FIG. 9 is a perspective view that shows the hollow half section that will be bonded together with another half.

In another alternative embodiment of the present invention, another method for joining sections together to form a hollow structure is the use of solid state diffusion bonding. FIG. 9 shows a semi-spherically hollow 76 or bowl-like half section 70 that will be bonded together with another half section. Once the two semi-spherically hollow 76 half sections 70 are placed together, they are heated, or the local interface between the half sections is heated and then they are pressed together. The semi-spherically hollow 76 half sections 70 can be pressed together co-axially or pressed together and rotated about their common axis.

What is important is that the surfaces 72 being bonded must have a minimum amount of flow or upset so that bonding can take place without melting any materials. The diffusion bonding process is completed without the upset required in inertia welding. FIG. 9 shows an example of a bonding surface 72 that has a series of grooves 74 to create uniform open space at the faying surfaces. This geometry can be machined or otherwise formed in the bonding surface 72 or another material such as a screen or perforated section can be used to upset the material during diffusion bonding. Some materials do not require a modified surface geometry for flow and subsequent diffusion bonding to occur.

Figure 10:
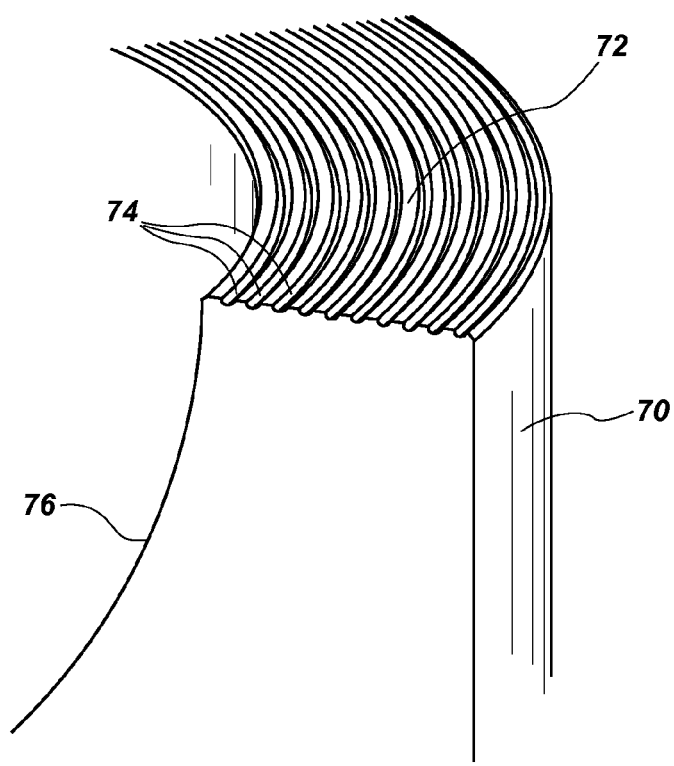
FIG. 10 is a close-up cross-sectional perspective view that shows more detail regarding FIG. 9.

FIG. 10 is a close-up cross-sectional perspective view of the interface geometry at the bonding surfaces 72 to be diffusion bonded. The grooves 74 and the semi-spherical hollow 76 of the half section 70 are more easily seen in this cross-section view.

Figure 11:
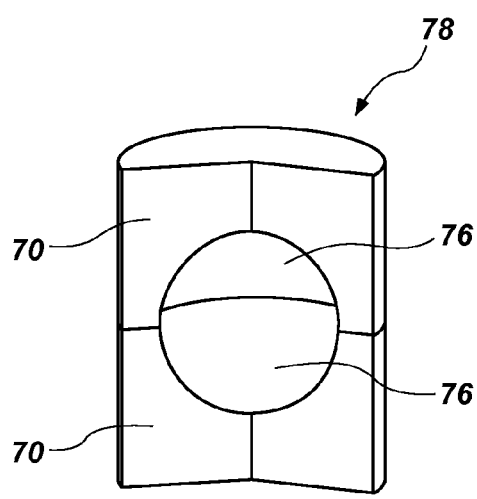
FIG. 11 is a cross-sectional perspective view that shows the half sections assembled.

FIG. 11 is a cross-sectional and perspective view of the two half sections 70 of FIG. 10 now bonded together. The two semi-spherical hollows 76 are visible within the assembly 78.

Figure 12:
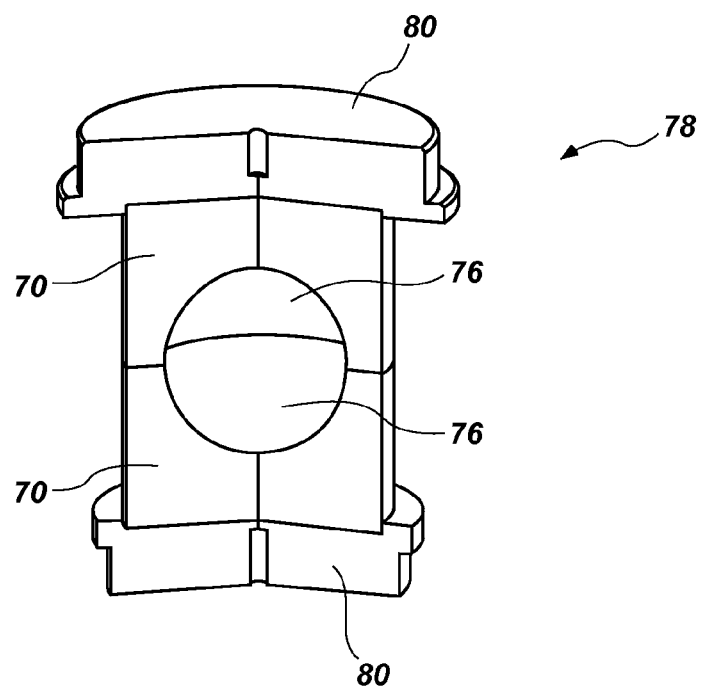
FIG. 12 is a cross-sectional perspective vies that shows end caps that are used to apply axial pressure to the half sections of FIG. 11 so they can be joined together as they are heated.

FIG. 12 is a cross-sectional and perspective view of the assembly 76 of FIG. 11 but which now shows end caps 80 that are used to apply axial pressure to the two half sections 70 so they can be joined together as they are heated. Heating can be applied using any appropriate method including resistance, induction, radiation, or conductive methods.

Figure 13:
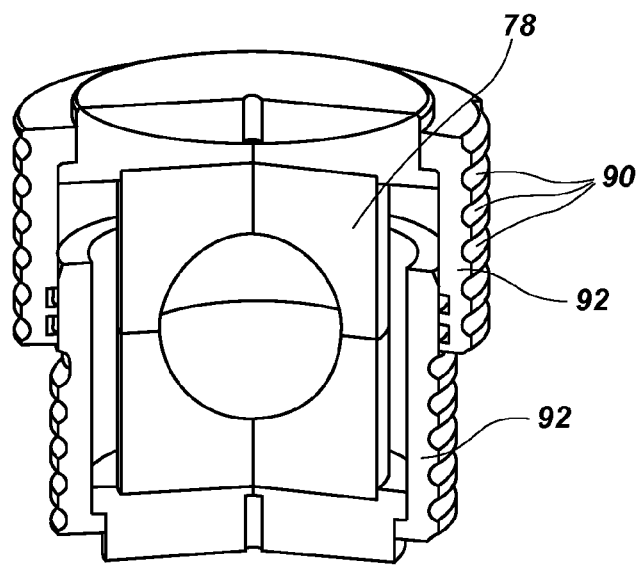
FIG. 13 is a cross-sectional perspective view of FIG. 12 that shows a containment configuration that allows for a vacuum and/or subsequent inert gas backfill process during diffusion bonding.

In some cases, materials to be joined together require a vacuum environment to improve bond strength by eliminating the possibility of oxide formation. FIG. 13 shows a containment configuration that allows for a vacuum and/or subsequent inert gas backfill process during diffusion bonding of the assembly 78. The grooves 90 shown on the outside of the containment housing 92 are for cooling tubes or any other convective cooling method.

Figure 14:
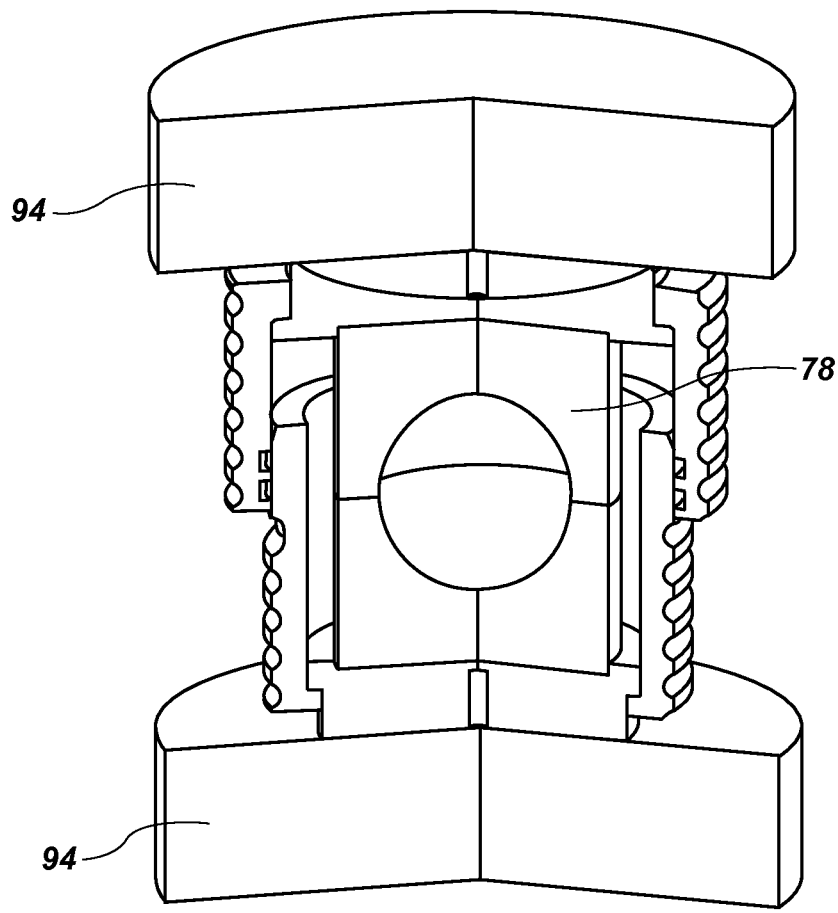
FIG. 14 is a cross-sectional perspective view of FIG. 13 that shows the addition of heating platens that can be used to apply heat to the pressure platens.

FIG. 14 shows the addition of heating platens 94 that can be used to apply heat to the pressure platens. In most cases the heating platens will use resistive heating and then through conductive heat transfer, heat will be applied to the assembly 78 to be diffusion bonded in the center of the chamber.

In an important alternative embodiment, inductive heating can be applied. An inductive coil can be placed near the parts on the inside of the chamber or the outside to inductively heat the hollow structural half sections 70. Once the components are heated, load can be placed axially as well as rotationally about the axis to join the half sections 70 together. Some materials may only require induction heating and the application of either and/or axial and rotational movements while other materials will require a vacuum to improve flow of the material.

After diffusion bonding of the assembly 78, an important factor in using AA 7075 is that the material is capable of being machined to create a sphere to a very high degree of precision. Another advantageous property of forming hollow spheres from AA 7075 is that a sphere could become stuck or lodged into a position that would prevent use of the bore hole or other structure in which it has been inserted. If the sphere were manufactured from steel, the bore hole would be a total loss. However, by manufacturing using AA 7075, the entire sphere could simply be drilled out to completely unblock the hole in which the sphere had become stuck.

Another factor in using AA 7075 is that it can replace other materials currently in use in wells as "frac balls". Frac balls are sometimes manufactured from a phenolic resin which is essentially a very hard plastic. However, a phenolic frac ball requires a significant amount of support so that the ball does not fail when it is making a seal. Phenolic frac balls will typically be used at pressures of up to 6,000 psi when used to seal a hole. A thick seating surface is needed or the phenolic frac ball will fail. However, by using AA 7075, an aluminum frac ball was created using the method of the present invention, and was able to withstand pressures of over 15,000 psi. Furthermore, the seating for the aluminum frac ball could be much thinner without failure. Thus, the sphere of AA 7075 combines strength with buoyancy in certain liquid media.

One problem with aluminum is that the thermal conductivity is very high which tends to softens up the sphere in high temperature environments. That is why the internal disk is typically made from another material such as steel in order to support the integrity of the hollow sphere.

It is to be understood that the above-described arrangements and embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for creating a hollow assembly that is bisected by a reinforcing disk using friction stir welding, said method comprising:
   1) providing two cylinders, each cylinder having a joining end that forms a hollow, the hollows in the two cylinders being two different shapes that form an assymetrical hollow;
   2) placing the two joining ends of the two cylinders to form a joint, with a reinforcing disk inserted therebetween;
   3) friction stir welding around the two cylinders at the joint to thereby join the two cylinders and the reinforcing disk, wherein a hollowed out and assymetrical inner space is now created at an interface of the two cylinders, with the reinforcing disk bisecting the inner space; and
   4) machining the two cylinders to form a hollow assembly that is centered around the inner space and the reinforcing disk, wherein the method further comprises manufacturing the hollow assembly into a ball.

2. The method as defined in claim 1 wherein the method further comprises perforating the reinforcing disk to thereby decrease the weight of the hollow assembly by removing material from the reinforcing disk.

3. The method as defined in claim 1 wherein the method further comprises using a material for the reinforcing disk that is different from the material used in the two cylinders to thereby bring a different material into the hollow assembly.

4. The method as defined in claim 1 wherein the method further comprises selecting a material or materials for the hollow assembly in order to achieve a neutral or positive buoyancy for a given fluid media.

5. The method as defined in claim 1 wherein the method further comprises selecting the material for the hollow assembly to be comprised of AA7075 aluminum.

6. The method as defined in claim 1 wherein the method further comprises manufacturing the hollow assembly as a frac ball or as a ball in a check valve.

7. The method as defined in claim 1 wherein the method further comprises manufacturing a first one of the two cylinders from a first material and manufacturing a second one of the two cylinders from a second material that is different from the first material.

8. The method as defined in claim 1 wherein the method further comprises manufacturing the reinforcing disk from a material that is different from the two cylinders that form the hollow assembly to thereby provide integrity to the hollow assembly when the hollow assembly is in a high temperature environment.

9. The method as defined in claim 8 wherein the method further comprises selecting a material for the reinforcing disk from the group of materials comprised of steel and other ferrous alloys.

* * * * *